United States Patent [19]

Williams

[11] Patent Number: 4,534,870

[45] Date of Patent: Aug. 13, 1985

[54] CROSSLINKER COMPOSITION FOR HIGH TEMPERATURE HYDRAULIC FRACTURING FLUIDS

[75] Inventor: Dennis A. Williams, Fort Worth, Tex.

[73] Assignee: The Western Company of North America, Fort Worth, Tex.

[21] Appl. No.: 392,602

[22] Filed: Jun. 28, 1982

[51] Int. Cl.$^3$ .................... C09K 3/00; E21B 43/16; E21B 43/26
[52] U.S. Cl. .................... 252/8.55 R; 166/283; 166/308; 166/305.1
[58] Field of Search ............ 252/8.55 R, 8.55 C, 252/315.01; 166/283, 274, 308, 275, 307, 305 R; 536/114; 260/429.3

[56] References Cited

U.S. PATENT DOCUMENTS

| | | | |
|---|---|---|---|
| Re. 26,639 | 8/1969 | Gibbons et al. | 260/429.3 |
| 2,720,468 | 10/1955 | Shacklett | 117/34 |
| 2,901,452 | 8/1959 | West | 260/429.3 |
| 3,056,818 | 10/1962 | Werber | 260/429.3 |
| 3,225,028 | 12/1965 | Nordgren | 536/114 |
| 3,301,723 | 1/1967 | Chrisp | 149/20 |
| 3,474,069 | 10/1969 | Thomas | 260/429.3 |
| 3,615,794 | 10/1971 | Nimerick | 106/208 |
| 3,882,029 | 5/1975 | Fischer et al. | 252/8.55 R |
| 3,888,312 | 6/1975 | Tiner et al. | 252/8.55 R |
| 3,959,003 | 5/1976 | Ostroot et al. | 252/8.55 R |
| 4,021,355 | 5/1977 | Holtmyer et al. | 252/8.55 R |
| 4,083,407 | 4/1978 | Griffin, Jr. et al. | 166/291 |
| 4,172,055 | 10/1979 | DeMartino | 252/8.55 C |
| 4,210,206 | 7/1980 | Ely et al. | 166/283 |
| 4,250,044 | 2/1981 | Hinkel | 166/308 |
| 4,265,311 | 5/1981 | Ely | 166/294 |
| 4,324,668 | 4/1982 | Harris | 252/8.55 C |
| 4,336,145 | 6/1982 | Briscoe | 252/8.55 R |
| 4,460,751 | 7/1984 | Hanlon et al. | 525/371 |

FOREIGN PATENT DOCUMENTS

| | | | |
|---|---|---|---|
| 0160990 | 2/1955 | Australia | 260/429.3 |
| 1124047 | 2/1962 | Fed. Rep. of Germany | 252/8.55 R |
| 2804355 | 8/1978 | Fed. Rep. of Germany | 260/429.3 |
| 2108122 | 5/1983 | United Kingdom | . |

OTHER PUBLICATIONS

Cotton, F. A. et al., 1966, Advanced Inorganic Chemistry: A Comprehensive Text, John Wiley and Sons, Inc., New York, pp. 914–918.
Article by Blumenthal in a 1967 *Rubber World* (Jan.) Magazine, Titled "Zirconium in the Cross-Linking of Polymers".

*Primary Examiner*—Stephen J. Lechert, Jr.
*Assistant Examiner*—Howard J. Locker
*Attorney, Agent, or Firm*—Richards, Harris, Medlock & Andrews

[57] ABSTRACT

A transition metal complex useful as a crosslinking agent for high temperature, high pH, water-based fracturing fluids incorporating polysaccharide polymers is provided. The crosslinker comprises a zirconium/triethanolamine complex having a Zr/TEA molar ratio of between about 1/6.0 and 1/10.0, with 1/6.5 to 1/9.5 being preferred. Methods for preparing the zirconium/triethanolamine crosslinker are also provided. The methods comprise mixing effective amounts of either n-butyl zirconate or n-propyl zirconate with triethanolamine until a uniform blend is obtained. Further, an improved hydraulic fracturing fluid incorporating a polysaccharide polymer, buffer, crosslinker, pH adjusting agent and antioxidant is provided wherein the improvement is utilizing a zirconium/triethanolamine crosslinker. Improved methods for crosslinking fracturing fluids and for hydraulically fracturing well formations are also provided.

18 Claims, 3 Drawing Figures

$C_{III}$ vs. TEMPERATURE
FOR HIGH TEMPERATURE FRAC FLUID

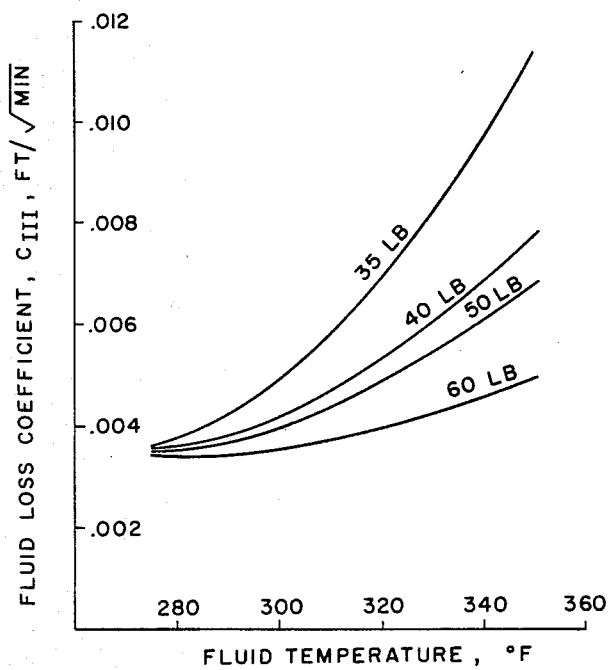
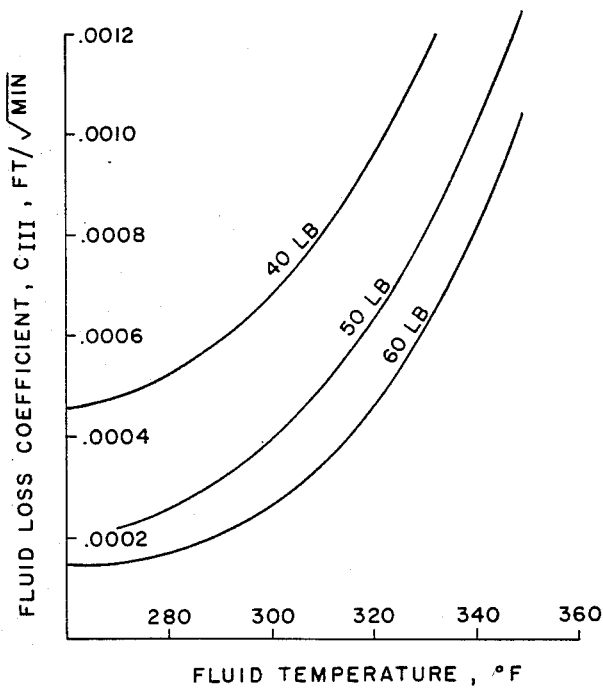

CROSSLINKER COMPOSITION FOR HIGH TEMPERATURE HYDRAULIC FRACTURING FLUIDS

TECHNICAL FIELD

The present invention relates to a transition metal complex useful as a crosslinker for water-based hydraulic fracturing fluids incorporating polysaccharide polymers and processes for preparing such crosslinkers. More specifically, a zirconium/triethanolamine complex is provided that is particularly useful as a crosslinker for high temperature (bottom hole static temperatures greater than about 200° F.), high pH fracturing fluids.

BACKGROUND ART

It is well known that production in petroleum, natural gas and geothermal wells can be greatly enhanced by hydraulic fracturing techniques. These techniques are known in the art and generally comprise introducing an aqueous solution of a water-soluble gum (e.g. guar gum) in which "proppants" (e.g. coarse sand or sintered bauxite) are suspended through the well bore under extremely high pressures into the rock structure in which the petroleum, gas or steam is entrained. Minute fissures in the rock are thereby created and held open by the suspended particles after the liquid has been drained off. The petroleum, gas or steam can then flow through this porous zone into the well. Viscofiers, fluid loss additives and breakers are often added to the fracturing composition to enhance the fracturing process. It is often desirable to utilize a crosslinking agent to speed the formation of a gel. Titanium crosslinkers are known to form stable gels at neutral pH up to about 250° F. to 275° F. At a pH of approximately 8 or 9, the titanium crosslinked gels are thermally stable up to about 300° F. to 325° F., but the shear stability of these high pH, titanium crosslinked gels is poor. A need exists, therefore, for a gel system stable for several hours at high pH and fluid temperatures in excess of 300° F.

SUMMARY OF THE INVENTION

In accordance with the present invention, a shear stable, temperature stable, high pH crosslinker for water-based hydraulic fracturing fluids incorporating polysaccharide polymers is provided. Methods for the preparation and utilization of such a crosslinker are also provided. The crosslinker comprises a zirconium/triethanolamine (Zr/TEA) complex derived from blending either n-propyl zirconate or n-butyl zirconate with triethanolamine to yield, in an exothermic reaction, the Zr/TEA complex. Zirconium to triethanolamine molar ratios of between about 1.0/6.0 and 1.0/10.0 are required, with Zr/TEA molar ratios of between about 1/6.5 to 1/9.5 being preferred. A Zr/TEA ratio of about 1/8.9 is most preferred.

Further in accordance with the present invention, a method for crosslinking water-based hydraulic fracturing fluids incorporating polysaccharide polymers is provided. In one embodiment, the method comprises introducing the desired ratios of Zr/TEA into the fracturing fluid by mixing the entire amount of the TEA with the Zr and then adding the resultant mixture to the fracturing fluid. Alternatively, a minimum amount of the TEA can be mixed with the Zr (e.g. about 3 moles TEA per mole of Zr) and the balance of the TEA premixed into the base gel formation. In either case, it is preferred that the resultant gel have a Zr/TEA ratio of between about 1/6.5 and 1/9.5 and a Zr content of between about 25 ppm and 60 ppm. The viscosity yields of the present crosslinker can be increased if the crosslinker is diluted with either n-propyl or n-butyl alcohol. Use of n-propyl alcohol is preferred for economic reasons. The diluted form of the crosslinker is prepared by blending 75% by volume of the crosslinker with n-propyl or n-butyl alcohol in an amount equal to 25% by volume.

The crosslinker of the present invention is most preferably utilized in conjunction with a water-based hydraulic fracturing fluid incorporating a polymer, buffer, pH adjusting agent and antioxidant. Clay stabilizers are propping agents can also be incorporated in the present fracturing fluids. Utilization of the present crosslinker makes it possible to employ lower polymer loadings, yet obtain superior stability at treating fluid temperatures well in excess of 350° F., thereby leading to cost savings, less likelihood of fracturing out of zone and less broken gel residue. Additionally, the longer crosslink time (up to 2 minutes) of the compositions of the present invention yields lower friction pressures and, as a result, lower pumping horsepower costs.

DETAILED DESCRIPTION

Figure 3:
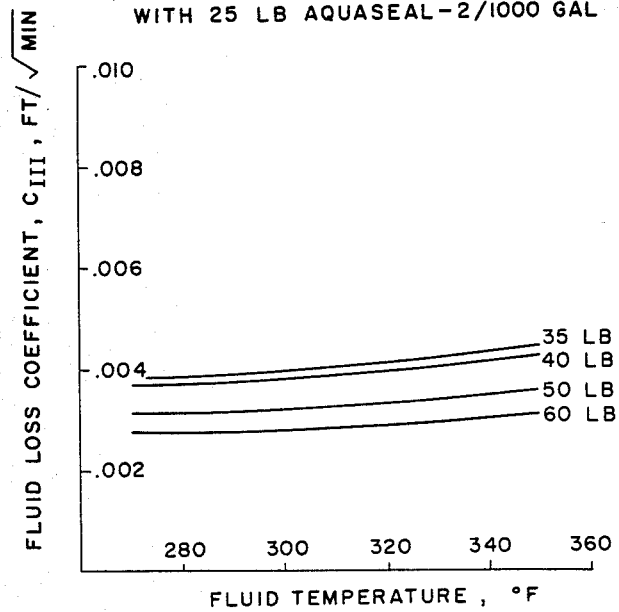

The crosslinker composition of the present invention comprises a zirconium/triethanolamine (Zr/TEA) complex having a Zr/TEA ratio of between about 1/6 and 1/10. Preferably, the Zr/TEA ratio is between about 1/6.5 and 1/9.5, with 1/8.9 being the most preferred. The crosslinker is prepared by mixing either n-propyl zirconate or n-butyl zirconate with triethanolamine to form, in a spontaneous reaction, the triethanolamine complex:

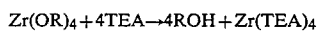

$$Zr(OR)_4 + 4TEA \rightarrow 4ROH + Zr(TEA)_4$$

where r = the n-propyl or n-butyl substituent. It is preferred that the n-propyl zirconate be used and that the resultant complex be diluted 25% by volume with either n-propyl or n-butyl alcohol. The triethanolamine, zirconate and diluent may be added in any order or simultaneously and should be mixed until a uniform blend is obtained. The specific gravity of a uniform blend of the n-propanol diluted crosslinker should be about 1.040±0.01 at 78° F. A uniform blend of the nondiluted crosslinker should have a specific gravity of about 1.115±0.01 at 75° F. The blending can be carried out in a thoroughly clean stainless steel vat, but the crosslinker complex should be stored in plastic drums or containers. It should be noted that mixing the above components will result in a 1% volume reduction. Further, caution is advised in handling the crosslinker as it is a flammable liquid.

The diluted crosslinker of the present invention should be added to the fracturing fluid in an amount equal to between about 0.4 gallons/1000 gallons of the crosslinked gel and 1.5 gallons/1000 gallons, with amounts equal to between about 0.5 gallon/1000 gallons and 1.0 gallons/1000 gallons being preferred. Loadings of 0.5 to 0.75 gallons/1000 gallons are most preferred for the nondiluted form of the crosslinker, while loadings of 0.75 to 1.0 gallons/1000 gallon are preferred for the diluted form. As noted earlier, it is preferred that the dilute form of the crosslinker be utilized. Additionally, the water used to prepare the gel should meet the following specifications:

| Ion Type | Concentration, ppm or mg/l |
|---|---|
| Water Quality | |
| for fracturing waters (including gelled weak acids): | |
| total phosphorous, as $PO_4^{-3}$ | <5 |
| total iron, as Fe, for gelled weak acids | <10 |
| Ferrous iron as $Fe^{+2}$ | <25 |
| Ferric iron as $Fe^{+3}$ | <150 |
| sulfite, as $SO_3^{-2}$ | <50 |
| sulfate, as $SO_4^{-2}$ | <175 |
| boron, as $H_3BO_3$ | <4 |
| calcium magnesium hardness, as $CaCO_3$ | <10 |
| pH < 5-9 buffering action | Buffer-3 must perform (6 ≦ pH ≦ 7.5) |
| total reducing agents | negative permanganate test |
| bacteria counts (water needing no biocide, ready to gel) | |
| aerobic | 10-1,000 |
| anaerobic | 1-10 |
| bacteria counts (water requiring biocide) | |
| aerobic | 1,000-1,000,000 |
| anaerobic | <10,000 |

The crosslinker can be added to the fracturing fluid by two methods. First, the entire amount of the zirconium and triethanolamine can be mixed as set forth above and then blended into the fracturing fluid immediately prior to introduction into the well formation. Secondly, a minimum amount of the triethanolamine can be mixed with the zirconium (e.g. about 3 moles triethanolamine per mol of zirconium) and the balance of the triethanolamine premixed with the base gel formation. In either case, it is preferred that the resultant gel have a Zr/TEA ratio of between about 1/6.5 and 1/9.5 and a zirconium content of between about 25 ppm and 60 ppm, with about 45 ppm being most preferred.

Further in accordance with the present invention, an improved water-based hydraulic fracturing fluid incorporating a polysaccharide polymer, buffer, crosslinker, pH adjusting agent and antioxidant is provided wherein the improvement is a crosslinker comprising a Zr/TEA complex having a Zr/TEA molar ratio of between about 1/6.0 and 1/10.0, with a ratio of 1/6.5 to 1/9.5 being preferred. Further, a clay control agent, such as KCl, can be added to the fracturing fluid. The pH adjusting agent should be capable of adjusting the pH to about 9.5 to obtain the greatest hydrolytic stability for the polymer. The antioxidant acts as a high temperature stabilizer and should be capable of scavenging oxygen and free radicals from the gel before they can degrade the polymer. The crosslinked fracturing fluid of the present invention can be used in well formations having bottom hole static temperatures of between about 200° F. and 650° F.

The present invention can be further exemplified through a study of the following examples which are not intended to limit the subject invention in any manner.

EXAMPLE 1

The improved high temperature fracturing fluid of the present invention was prepared as follows and subjected to flow loop testing to evaluate the system:
  25 gallons tap water (61° F.);
  465 g of J-12* (40 lb./1000 gal.);
  233 g of Gel Master* (20 lb./1000 gal.); and
  46.5 g of Buffer-3* (4 lb./1000 gal.)

were mixed for five minutes, and hydrated for 30 minutes. Next, 58 g of $Na_2CO_3$ (soda ash) (5 lb/1000 gal.), and 97 ml of diluted Zr/TEA (1.0 gal./1000 gal.) were added and mixed for approximately one minute. The composition was then poured into the flow loop and circulation begun. Flow loop test conditions were 245° F. and about 100 seconds$^{-1}$ of shear. Throughout the test, a differential pressure across 20 feet of one inch pipe was measured, in addition to the flow rate. Samples of the fluid were taken throughout the test, cooled to 180° F., and measured on a Baroid Viscometer. These results are summarized in Table I. Rheological data was also obtained from the pipe flow loop at 245° F. and is reported in Table II.

*These materials are commercially available from the Western Company of North America.

TABLE I

| | Baroid Viscometer Data | | |
|---|---|---|---|
| | Temp., °F., Circulating Fluid | Viscosity, cP, @ 511 sec$^{-1}$ (300 RPM) | Viscosity, cP, @ 170 sec$^{-1}$ (100 RPM) |
| Initial | 86 | 90 | 129 |
| 0.5 Hour | 246 | 138* | 231* |
| 1.0 Hour | 248 | 132* | 222* |
| 2.0 Hour | 248 | 102* | 180* |
| 3.0 Hour | 248 | 83* | 147* |

*Samples cooled to approximately 180° F. before measuring on the Baroid Viscometer.

TABLE II

| | n' | k' | Calculated Viscosity, cP, @ 170 sec $^{-1}$ |
|---|---|---|---|
| Initial | 0.447 | 0.1750 | 490 |
| 4.5 Hour | 0.565 | 0.0178 | 91 |

EXAMPLE II

The following example compares the diluted form of the Zr/TEA crosslinker with the nondiluted form. The diluted Zr/TEA complex was prepared by adding 25% n-propyl alcohol by volume to the nondiluted complex. Equivalent loadings of the nondiluted and diluted crosslinker were used to complex a high temperature fracturing fluid (50 lb. polymer per 1000 gal.) for testing on the Fann 50C at 250° F. Complexing was performed at 100° F. and the gels sheared for one minute before being placed on the Fann 50C. Results for the nondiluted and diluted crosslinker are summarized below in Tables III and IV, respectively. Examination of this data indicates that the diluted form of the crosslinker gives a higher viscosity yield than does the nondilute form.

TABLE III

| Viscosity, n' and K' @ 250° F. When Crosslinked w/0.38 gal Zr/TEA/1000 gal. | | | |
|---|---|---|---|
| Time, hr | Viscosity, cP | n' | K', lb/sec'/ft$^2$ |
| 0.0 | 256 | 0.56 | 0.056 |
| 1.0 | 141 | 0.56 | 0.027 |
| 2.0 | 93 | 0.58 | 0.017 |
| 3.0 | 75 | 0.58 | 0.014 |
| 4.0 | 60 | 0.59 | 0.011 |
| 5.0 | 52 | 0.60 | 0.009 |

TABLE IV

Viscosity, n' and K' @ 250° F. When Crosslinked w/0.5 gal Dilute Zr/TEA/1000 gal

| Time, hr. | Viscosity, cP | n' | K', lb/sec'/ft$^2$ |
|---|---|---|---|
| 0.0 | 462 | 0.61 | 0.087 |
| 1.0 | 209 | 0.67 | 0.026 |
| 2.0 | 159 | 0.71 | 0.016 |
| 3.0 | 136 | 0.77 | 0.010 |
| 4.0 | 110 | 0.78 | 0.008 |
| 5.0 | 96 | 0.79 | 0.007 |

EXAMPLE III

Tables V through VIII set forth the results of laboratory test of the following gel system:

J-16*—40 to 60 lb./1000 gal.
KCL—0-2% by weight of water
Gel Master*—10 lb./1000 gal.
Na$_2$CO$_3$—5 lb./1000 gal.
Diluted Zr/TEA—1.0 gal./1000 gal.

*These materials are commercially available from the Western Company of North America.

Table V lists rheological data for the high temperature fracturing fluids at 300° F. and 325° F. As can be seen, these systems have useful viscosities (greater than 50 cP at 170 sec$^{-1}$) for greater than 6 hours at these temperatures.

Fluid loss data on the high temperature fracturing fluid is set forth in Table VI and illustrated graphically in FIG. 1. Fluid loss data on the high temperature fracturing fluid with a 5% hydrocarbon phase is listed in Table VII and illustrated graphically in FIG. 2. Finally, fluid loss data on the high temperature fracturing fluid with 25 lb. Aquaseal-2/1000 gal. added is listed in Table VIII and set forth graphically in FIG. 3. As can be seen, the addition of 5% hydrocarbon dramatically reduces the C$_{III}$ fluid loss coefficient, which is the controlling fluid loss factor for this system. The addition of Aquaseal helps, but not to the degree seen for the 5% hydrocarbon.

TABLE V

RHEOLOGY DATA FOR HIGH TEMPERATURE FRACTURING FLUID

| POLYMER LOADING | TEMP, (°F.) | TIME, (Hrs) | N' | K' | VISCOSITY @ 170 sec$^{-1}$ |
|---|---|---|---|---|---|
| 50 LB/1000 GAL | 300 | 0.0 | 0.68 | 0.014 | 167 |
| | | 1.0 | 0.68 | 0.019 | 165 |
| | | 2.0 | 0.65 | 0.017 | 155 |
| | | 3.0 | 0.58 | 0.018 | 140 |
| | | 4.0 | 0.53 | 0.017 | 122 |
| | | 5.0 | 0.62 | 0.014 | 104 |
| | | 6.0 | 0.73 | 0.009 | 90 |
| 60 LB/1000 GAL | 325 | 0.0 | 0.79 | 0.015 | 396 |
| | | 1.0 | 0.57 | 0.056 | 352 |
| | | 2.0 | 0.61 | 0.056 | 267 |
| | | 3.0 | 0.61 | 0.041 | 180 |
| | | 4.0 | 0.67 | 0.016 | 112 |

TABLE VI

HIGH TEMPERATURE FRACTURING FLUID w/o HYDROCARBON PHASE

| GEL LOADING (lb./1000 gal) | TEMP. (°F.) | PERM. (md) | SPURT (cc) |
|---|---|---|---|
| 35 | 275 | 0.220 | 0 |
| 35 | 300 | 0.790 | 0 |
| 40 | 275 | 0.620 | 0 |
| 40 | 300 | 0.110 | 0 |
| 50 | 275 | 0.170 | 0 |
| 50 | 300 | 0.420 | 0 |
| 50 | 325 | 0.200 | 0 |
| 60 | 275 | 0.620 | 0 |
| 60 | 300 | 0.230 | 0 |
| 60 | 325 | 0.560 | 0.58 |
| 60 | 350 | 0.340 | 0 |

*For permeabilities below 0.10 MD, spurt loss is 0.

TABLE VII

HIGH TEMPERATURE FRACTURING FLUID w/5% HYDROCARBON PHASE

| GEL LOADING (lb./1000 Gal) | TEMP. (°F.) | PERM. (md) | SPURT (cc) |
|---|---|---|---|
| 35 | 275 | 0.340 | 0 |
| 35 | 275 | 0.510 | 0 |
| 35 | 300 | 0.310 | 3.46 |
| 35 | 300 | 0.420 | 0.90 |
| 40 | 275 | 0.396 | 2.31 |
| 40 | 275 | 0.310 | 0 |
| 40 | 300 | 0.113 | 0 |
| 40 | 300 | 0.950 | 0 |
| 50 | 275 | 3.500 | 0 |
| 50 | 300 | 1.190 | 0 |
| 50 | 300 | 0.900 | 1.40 |
| 60 | 275 | 3.800 | 0 |
| 60 | 275 | 0.230 | 0.05 |
| 60 | 300 | 0.283 | 0 |
| 60 | 300 | 0.110 | 0 |
| 60 | 300 | 0.565 | 2.30 |
| 60 | 300 | 0.266 | 0 |
| 60 | 325 | 0.200 | 0 |
| 60 | 325 | 1.350 | 0 |

*For permeabilities below 0.10 MD, spurt loss is 0.

TABLE VIII

High Temperature Fracturing Fluid w/25 lb. AQUASEAL-2/1000 gal

| GEL LOADING (lb./1000 gal) | TEMP. (°F.) | PERM. (md) | SPURT (cc) |
|---|---|---|---|
| 35 | 275 | 0.220 | 0 |
| 35 | 300 | 1.300 | 0 |
| 40 | 275 | 0.340 | 0 |
| 40 | 300 | 0.620 | 0.58 |
| 50 | 275 | 0.730 | 0 |
| 50 | 300 | 0.200 | 0 |
| 50 | 325 | 0.200 | 0 |
| 60 | 275 | 0.080 | 0 |
| 60 | 300 | 0.450 | 0 |
| 60 | 325 | 0.340 | 0 |
| 60 | 350 | 0.620 | 0 |

*For permeabilities below 0.10 MD, spurt loss is 0.

One of ordinary skill in the art upon reading the above specification and examples will appreciate that the subject invention can be modified or adapted in a variety of ways. All such modifications or adaptations which fall within the scope of the appended claims are intended to be covered thereby.

I claim:

1. A method of crosslinking a high temperature, high pH, water-based fracturing fluid incorporating polysaccharide polymers wherein the resultant fracturing fluid is stable at bottom hole static temperatures in excess of about 200 degrees F. at a pH in excess of 7.0, comprising: adding an effective amount of a zirconium/triethanolamine complex having a Zr/TEA molar ratio of between about 1/6.0 and 1/10.0 to the fracturing fluid.

2. The method as recited in claim 1 wherein the Zr/TEA molar ratio is between about 1/6.5 and 1/9.5.

3. The method as recited in claim 1 wherein the zirconium/triethanolamine complex is added to the fracturing fluid in an amount of between about 0.4 gallons/1000 gallons of fracturing fluid and 1.5 gallons/1000 gallons of fracturing fluid.

4. The method as recited in claim 1 wherein the zirconium/triethanolamine complex is added to the fracturing fluid in an amount of between about 0.5 gallons/1000 gallons of fracturing fluid and 0.75 gallons/1000 gallons of fracturing fluid.

5. The method as recited in claim 1 wherein the zirconium/triethanolamine complex is diluted with n-propyl alcohol 25% by volume.

6. The method as recited in claim 1 wherein the zirconium/triethanolamine complex is diluted with n-butyl alcohol approximately 25% by volume.

7. The method as recited in claim 5 wherein the zirconium/triethanolamine complex is added to the fracturing fluid in an amount of between about 0.4 gallons/1000 gallons of fracturing fluid and 1.5 gallons/1000 gallons of fracturing fluid.

8. The method as recited in claim 5 wherein the zirconium/triethanolamine complex is added to the fracturing fluid in an amount of between about 0.75 gallons/1000 gallons of fracturing fluid and 1.0 gallons/1000 gallons of fracturing fluid.

9. The method as recited in claim 6 wherein the zirconium/triethanolamine complex is added in an amount of between about 0.4 gallons/1000 gallons of fracturing fluid and 1.5 gallons/1000 gallons of fracturing fluid.

10. The method as recited in claim 6 wherein the zirconium/triethanolamine complex is added to the fracturing fluid in an amount of between about 0.75 gallons/1000 gallons of fracturing fluid and 1.0 gallons/1000 gallons of fracturing fluid.

11. An improved high temperature, high pH, water-based fracturing fluid incorporating a polysaccharide polymer, buffer, crosslinker, pH adjusting agent and antioxidant wherein the improvement comprises a crosslinker comprised of a zirconium/triethanolamine complex having a Zr/TEA molar ratio of between about 1/6.0 and 1/10.0, said fracturing fluid being stable at bottom hole static temperatures in excess of about 200 degrees F. at a pH in excess of 7.0.

12. The improved fracturing fluid as recited in claim 11 wherein the Zr/TEA molar ratio is between about 1/6.5 and 1/9.5.

13. The improved fracturing fluid as recited in claim 11 wherein the zirconium/triethanolamine complex is diluted with n-propyl alcohol 25% by volume.

14. The improved fracturing fluid as recited in claim 11 wherein the zirconium/triethanolamine complex is diluted with n-butyl alcohol 25% by volume.

15. An improved method for hydraulically fracturing well formations with a high temperature, high pH, water-based fracturing fluid incorporating a polysaccharide polymer, buffer, crosslinker, pH adjusting agent and antioxidant, wherein the improvement comprises utilizing a zirconium/triethanolamine complex having a Zr/TEA molar ratio of between about 1/6.0 and 1/10.0 to crosslink the fracturing fluid whereby the resultant fluid is stable at bottom hole static temperature in excess of about 200 degrees F. at a pH in excess of 7.0.

16. The improved method as recited in claim 15 wherein the Zr/TEA molar ratio of the crosslinker is between about 1/6.5 and 1/9.5.

17. The improved method as recited in claim 15 wherein the zirconium/triethanolamine complex crosslinker is diluted with n-propyl alcohol 25% by volume.

18. The improved method as recited in claim 15 wherein the zirconium/triethanolamine complex crosslinker is diluted with n-butyl alcohol 25% by volume.

* * * * *